(12) United States Patent
Uno

(10) Patent No.: US 6,768,273 B2
(45) Date of Patent: Jul. 27, 2004

(54) DYNAMO CONTROL CIRCUIT FOR A BICYCLE

(75) Inventor: Kouji Uno, Osaka (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 10/083,226

(22) Filed: Feb. 25, 2002

(65) Prior Publication Data

US 2002/0117978 A1 Aug. 29, 2002

(30) Foreign Application Priority Data

Feb. 28, 2001 (JP) .............................. 2001-055058

(51) Int. Cl.⁷ .................. H05B 37/02; H05B 37/00
(52) U.S. Cl. .................... 315/291; 315/297; 315/313
(58) Field of Search ........................ 315/291, 77, 82, 315/297, 313, 315, 76, 78, 314, 320; 363/60, 61, 125, 127; H05B 37/02, 37/00

(56) References Cited

U.S. PATENT DOCUMENTS

| | | | | |
|---|---|---|---|---|
| 5,455,485 A | * | 10/1995 | Kutter | 315/78 |
| 5,818,115 A | * | 10/1998 | Nagao | 290/31 |
| 6,081,434 A | * | 6/2000 | Kinoshita et al. | 363/24 |
| 6,418,041 B1 | * | 7/2002 | Kitamura | 363/125 |
| 6,573,686 B2 | * | 6/2003 | Uno | 320/123 |
| 2002/0079851 A1 | * | 6/2002 | Uno | 318/254 |

FOREIGN PATENT DOCUMENTS

| | | | | |
|---|---|---|---|---|
| CH | 676221 A5 | 12/1990 | | |
| DE | 3347495 A1 | 7/1985 | | |
| DE | 4429693 A1 | 3/1995 | | |
| GB | 2126438 A | 3/1984 | | |
| JP | 2000-62523 | 2/2000 | | |
| JP | 2000-67614 | 3/2000 | | |
| JP | 2000-198477 | 7/2000 | | |
| WO | WO 81/01349 | * 5/1981 | ............ H02J/7/00 | |

* cited by examiner

Primary Examiner—Don Wong
Assistant Examiner—Trinh Vo Dinh
(74) Attorney, Agent, or Firm—James A. Deland

(57) ABSTRACT

A bicycle charge control circuit for receiving electric power from a bicycle dynamo and for controlling the operation of a lamp and a charging circuit includes a lamp switch for selectively providing power from the dynamo to the lamp, a battery charged by the dynamo, and a lamp control circuit operatively coupled to the first lamp switch and to the battery to control the first lamp switch to intermittently supply power to the lamp when the battery voltage is below a selected value.

17 Claims, 2 Drawing Sheets

DYNAMO CONTROL CIRCUIT FOR A BICYCLE

BACKGROUND OF THE INVENTION

The present invention is directed to bicycles and, more particularly, to a circuit for controlling power from a dynamo.

Bicycles are typically equipped with a dynamo that provides power for lighting a lamp, such as a headlamp. Devices for controlling lamp operation are disclosed, for example, in Japanese Unexamined Patent Application 5-238447 and Unexamined Patent Application 2000-62523. According to the device taught in the former publication, the terminal voltage of the battery is sensed, and the field current of the dynamo is controlled with reference to the sensor output so at to reduce the physical demands on the rider and to stabilize lamp brightness. According to the device taught in the latter publication, a charge capacitor is provided so that electrical power may be supplied to the lamp by the charge capacitor during times of low power generation by the dynamo.

Newer bicycles are often equipped with additional devices driven by the dynamo, such as actuators for changing speed in electrically-powered gear shifting systems, actuators for regulating damper force in electrically-powered suspensions, and indicator backlights for cycle computers (such devices are hereinafter referred to as "electrically-powered units"). Such electrically powered units experience unstable operation when drive voltage goes below a certain predetermined voltage. For example, if an actuator consists of a motor, lower drive voltage may result in problems such as slow speed or an inability to operate at normal speed; in an electrically-powered gear shifting system coming to a halt in the middle of a shift operation; or in the actuator in an electrically-powered suspension suddenly becoming non-operational. When an electrically powered unit employs a microprocessor, errors in operation may result. In the case of an indicator backlight, visibility may be impaired due to insufficient illumination.

For the same given dynamo speed, voltage is lower when the lamp is on than when it is off, and thus particularly in bicycles equipped with electrically-powered units of the kind described above, it is crucial to achieve stable charged voltage. However, conventional devices like those described above, while capable of supplying stable electric power to a lamp, are not capable of supplying stable electric power to the other electrically powered units. This results in a need to provide a step-up transformer or step-up circuit in order to provide stable power supply to electrically-powered units while keeping the lamp lit, which results in the problem of higher device cost.

SUMMARY OF THE INVENTION

The present invention is directed to a dynamo control circuit for a bicycle wherein lamp operation is controlled to reduce the load on the battery. In one embodiment of the present invention, a bicycle charge control circuit for receiving electric power from a bicycle dynamo and for controlling the operation of a lamp and a charging circuit includes a lamp switch for selectively providing power from the dynamo to the lamp, a battery charged by the dynamo, and a lamp control circuit operatively coupled to the first lamp switch and to the battery to control the first lamp switch to intermittently supply power to the lamp when the battery voltage is below a selected value. In a more specific embodiment, a rectifier rectifies power from the dynamo to the battery, and the lamp control circuit controls the lamp switch to supply power to the lamp at intervals approximately equal to half-cycles of the output voltage of the dynamo. The lamp control circuit allows full power to be communicated to the lamp when the battery voltage is above the selected value.

DETAILED DESCRIPTION OF THE EMBODIMENTS

Figure 1:
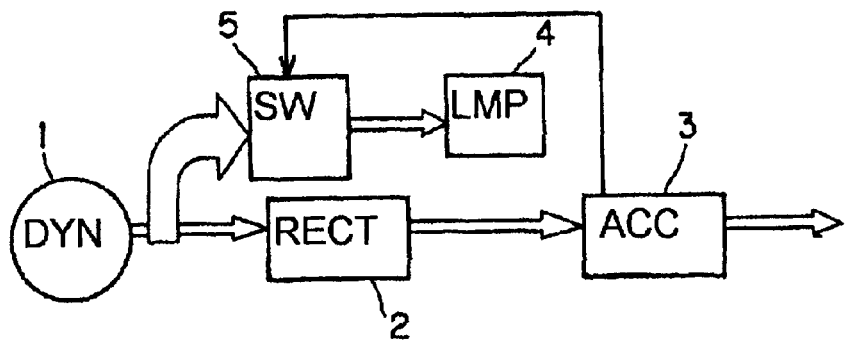
FIG. 1 is a block diagram of a particular embodiment of a dynamo control circuit according to the present invention.

FIG. 1 is a block diagram of a particular embodiment of a dynamo control circuit according to the present invention. As shown in FIG. 1, the dynamo control circuit comprises a dynamo (DYN) 1 serving as a generator; a rectifier circuit (RECT) 2; an accumulator (ACC) 3 serving as the power supply for the electrically-powered units; a lamp (LMP) 4; and a switch (SW) 5 situated between the dynamo 1 and the lamp 4. Dynamo 1 comprises, for example, a hub dynamo housed within the hub of the front wheel of the bicycle. Rectifier circuit 2 is a circuit for rectifying the AC voltage output of dynamo 1, and it includes a diode and the like. Accumulator 3 is a device that includes a capacitor, transistor, etc., and controls on/off operation of switch 5 by means of its charged voltage.

Figure 2:
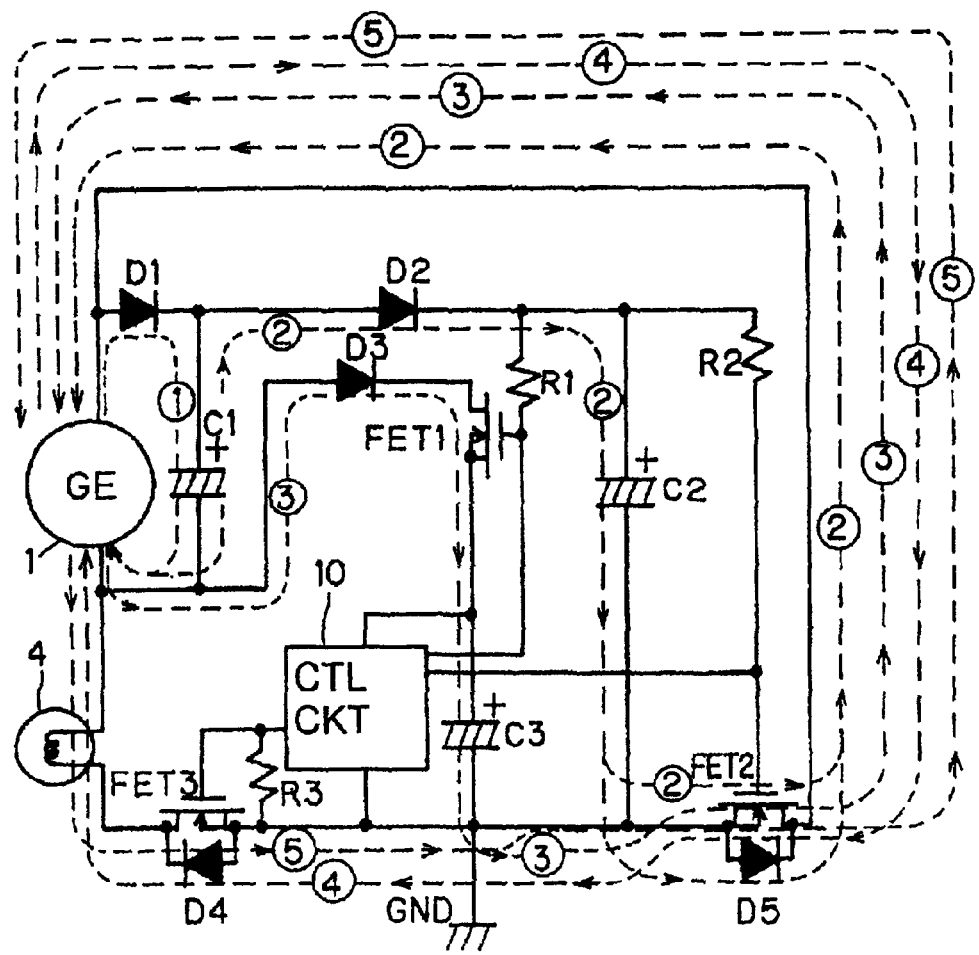
FIG. 2 is a detailed schematic diagram of a particular embodiment of the dynamo control circuit shown in FIG. 1.

FIG. 2 is a detailed schematic diagram of a particular embodiment of the dynamo control circuit shown in FIG. 1. As shown in FIG. 2, dynamo 1 is coupled with a first capacitor C1, a second capacitor C2, a first diode D1, and a second diode D2. In this circuit, the first and second capacitors C1, C2 and the first and second diodes D1, D2 constitute a voltage-doubling rectifier circuit. The first capacitor C1 is charged during the positive half-cycle of dynamo 1 output, and during the subsequent negative half-cycle the second capacitor C2 is charged with voltage equal to the voltage generated by dynamo 1 plus the charged voltage of the first capacitor C1. Thus, the second capacitor C2 can acquire high charged voltage at low speed. The second capacitor C2 functions as a power supply for driving first and third field-effect transistors FET1 and FET3, described later.

A third diode D3 serving as a rectifier circuit is coupled with dynamo 1, and the output of this third diode D3 is coupled, via the first field-effect transistor (hereinafter simply "transistor") FET1, to a third capacitor C3 serving as a rechargeable battery. The gate of first transistor FET1 is coupled, via a first resistor R1, to the second capacitor C2. In this circuit, the third diode D3 allows the third capacitor C3 to be charged, via first transistor FET1, with the output of dynamo 1 only during the negative half-cycle thereof. As is well known for such transistors, if the potential at the gate of first transistor FET1 is higher than that at the source by more than a predetermined level (2 V, for example), first transistor FET1 switches on. Since the voltage of the second capacitor C2 is applied to the gate of the first transistor FET1, the applied voltage is sufficiently high even under the low speed condition described earlier, the first transistor FET1 is stabilized in the ON state, and the third capacitor C3 charging operation is stabilized.

The second transistor FET2, third transistor FET3 (corresponding to switch 5 in FIG. 1) and lamp 4 are connected in series to dynamo 1. Diode D5, shown connected in parallel with second transistor FET2, and diode D4, shown connected in parallel with third transistor FET3, are parasitic diodes for the respective transistors FET2, FET3. The gate of the second transistor FET2 is coupled via a second resistor R2 to the second capacitor C2, and the gate of the third transistor FET3 is coupled to a control circuit 10. A third resistor R3 is also connected in parallel with the gate of third transistor FET3.

With this circuit arrangement, the gate potential of the first transistor FET1 can be controlled by control circuit 10 to control charging of the third capacitor C3, and the gate potential of the third transistor FET3 can be controlled according to the charged voltage of the third capacitor C3 to control on/off operation of the third transistor FET3. By switching off the second transistor FET2 together with the third transistor FET3, the lamp 4 can be extinguished completely.

The operation of the circuit will now be described. It is assumed that all capacitors are initially empty. First, during the positive half-cycle of the output of dynamo 1, current flows over path (1):

(1): dynamo→D1→C1→dynamo

This results in charging the first capacitor C1. The voltage across the first capacitor C1 reaches approximately the dynamo output peak voltage of 0.6 V.

During the subsequent negative half-cycle current flows in reverse over path (2):

(2): dynamo→C1→D2→C2→D5→dynamo

This results in charging the second capacitor C2. The current supplied to the second capacitor C2 is equal to the current from dynamo 1 plus current from the charged first capacitor C1. Thus, the second capacitor C2 can be charged adequately even at low speed. When the voltage across the second capacitor C2 reaches {(voltage across C3)+(ON trigger voltage for gate of FET1)}, the first transistor FET1 turns on. The second transistor FET2 turns on as well. Thus, current now flows also over path (3):

(3): dynamo→D3→FET1→C3→FET2→dynamo

This initiates charging of the third capacitor C3. With this arrangement, the third capacitor C3 can be stably charged to relatively high voltage during the negative half-cycle of dynamo output only. Furthermore, as the voltage applied to the gate of the first transistor FET1 can be stabilized by the second capacitor C2, the ON state of the first transistor FET1 can be stabilized.

At this time the voltage across the third capacitor C3 is not adequate for driving other electrically powered units in a stable manner. Thus, the voltage applied to the gate of the third transistor FET3 is controlled by the control circuit 10 so that the third transistor FET3 remains off. During the positive half-cycle, the first capacitor C1 is charged by means of current flowing over path (1):

(1): dynamo→D1→C1→dynamo as described above, and the lamp 4 is lit by means of current flowing over path (4):

(4): dynamo→FET2→D4→lamp→dynamo.

During the subsequent negative half-cycle, the second capacitor C2 and third capacitor C3 are charged by means of current flowing over path (2):

(2): dynamo→C1→D2→C2→FET2→dynamo and current flowing over path (3):

(3): dynamo→D3→FET1→C3→FET2→dynamo.

The above operation by means of current flowing over paths (1) and (4) during the positive half-cycle of dynamo output and operation by means of current flowing over paths (2) and (3) during the negative half-cycle, are performed repeatedly.

Figures 3A, 3B:
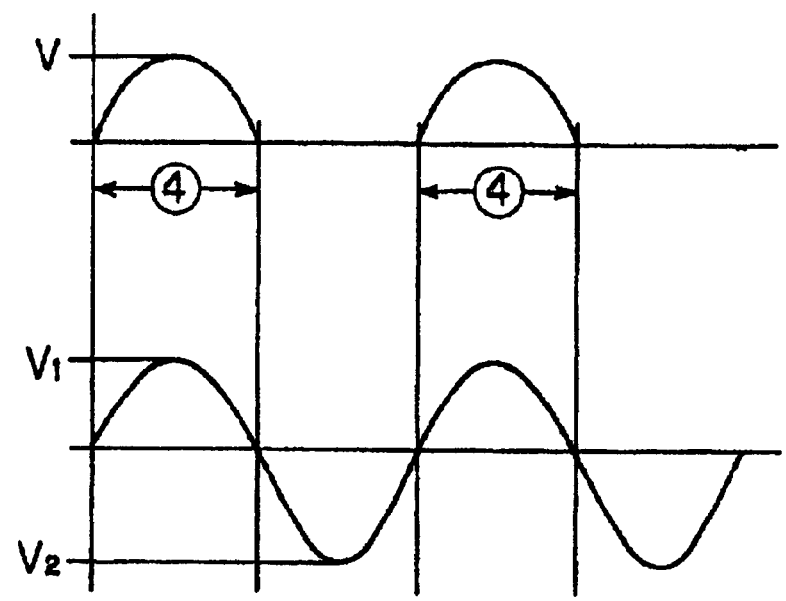
FIGS. 3(A–B) are waveforms showing the voltages supplied to the lamp and by the dynamo when the battery voltage is below a selected value.

FIG. 3(*b*) shows the waveform of dynamo output in this case, and FIG. 3(*a*) shows the waveform of the voltage applied to the lamp. As will be apparent from the drawings, the lamp 4 is lit during the positive half-cycle of dynamo output, while the rechargeable battery (capacitor C3) is charged during the negative half-cycle. In FIG. 3(*b*), the positive peak voltage V1 is lower than the negative peak voltage V2; this is due to a drop in voltage in the dynamo resulting from the lamp load. The third capacitor C3 is repeatedly recharged in this manner, and when the voltage across the third capacitor C3 reaches a level sufficient to drive other devices, the third transistor FET3 is turned on by the control circuit 10. This causes current to flow over path(5);

(5) dynamo→lamp→FET3→FET2→dynamo so that the lamp lights. In this state the lamp is lit not intermittently, but continuously during both the positive and negative half-cycles of dynamo output. The lamp 4 can be extinguished completely by switching off the second transistor FET2 in addition to the third transistor FET3.

In the embodiment described above, the three transistors FET1, 2, 3, the second and third capacitors C2, C3, and the control circuit 10 have uniform GND level, thus obviating the need to provide a special circuit for providing uniform ground level for the elements and enabling the three transistors to be switched easily. Furthermore, since the power for operation of the control circuit 10 is obtained from the third capacitor C3, application of high voltage from the dynamo to the control circuit 10 can be prevented, thus obviating the need for circuitry to protect the control circuit 10.

While the above is a description of various embodiments of the present invention, further modifications may be employed without departing from the spirit and scope of the present invention. For example, the size, shape, location or orientation of the various components may be changed as desired. Components that are shown directly connected or contacting each other may have intermediate structures disposed between them. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A bicycle charge control circuit for receiving electric power from a bicycle dynamo and for controlling the operation of a lamp and a charging circuit, the circuit comprising:

a first lamp switch for selectively providing power from the dynamo to the lamp;

a battery charged by the dynamo; and a lamp control circuit operatively coupled to the first lamp switch and to the battery to control the first lamp switch to intermittently supply power to the lamp from the dynamo while the battery voltage is below a selected value so that the lamp is illuminated while the battery voltage is below the selected value and the dynamo is intermittently supplying power.

2. The circuit according to claim 1 further comprising a rectifier that rectifies power from the dynamo to the battery.

3. The circuit according to claim 2 wherein the lamp control circuit controls the first lamp switch to supply power to the lamp at intervals approximately equal to half-cycles of the output voltage of the dynamo.

4. The circuit according to claim 1 further comprising:

a charging switch for selectively providing power from the dynamo to the battery; and a charging switch control circuit that controls the operation of the charging switch.

5. The circuit according to claim 4 wherein the charging switch comprises a charging transistor, and wherein the charging switch control circuit comprises:
 a first capacitor charged by current output by the dynamo during one of a positive half-cycle and a negative half-cycle thereof; and
 a second capacitor charged by current output by the dynamo during the other one of the positive half cycle and the negative half-cycle thereof as well as by current from the first capacitor;
 wherein voltage from at least one of the first and second capacitors is applied to a control terminal of the charging transistor.

6. The circuit according to claim 5 wherein the first capacitor is charged by current output by the dynamo during the positive half-cycle thereof, and wherein the second capacitor is charged by current output by the dynamo during the negative half-cycle thereof as well as current from the first capacitor.

7. The circuit according to claim 1 wherein the battery comprises a battery capacitor.

8. The circuit according to claim 1 wherein the first lamp switch comprises a first lamp transistor.

9. The circuit according to claim 8 further comprising a second lamp transistor connected in series with the first lamp transistor, and wherein the lamp control circuit controls the second lamp transistor based on a voltage of the battery.

10. A bicycle charge control circuit for receiving electric power from a bicycle dynamo and for controlling the operation of a lamp and a charging circuit, the circuit comprising:
 a lamp switch for selectively providing power from the dynamo to the lamp;
 a battery charged by the dynamo; and
 a lamp control circuit operatively coupled to the lamp switch and to the battery to control the lamp switch to intermittently supply power to the lamp when a battery voltage is below a selected value, wherein the lamp control circuit comprises:
  a first capacitor;
  a first diode coupled for communicating power from the dynamo to the first capacitor during one of a positive half-cycle and a negative half-cycle of the dynamo;
  a second capacitor; and
  a second diode coupled for communicating power from the dynamo to the second capacitor during the other one of the positive half-cycle and the negative half-cycle of the dynamo as well as current from the first capacitor.

11. A bicycle charge control circuit for receiving electric power from a bicycle dynamo and for controlling the operation of a lamp and a charging circuit, the circuit comprising:
 a lamp switch for selectively providing power from the dynamo to the lamp;
 a battery charged by the dynamo; and
 a lamp control circuit operatively coupled to the lamp switch and to the battery to control the lamp switch to intermittently supply power to the lamp when a battery voltage is below a selected value, wherein the lamp control circuit comprises:
  a first capacitor;
  a first diode coupled for communicating power from the dynamo to the first capacitor during one of a positive half-cycle and a negative half-cycle of the dynamo;
  a second capacitor;
  a second diode coupled for communicating power from the dynamo to the second capacitor during the other one of the positive half-cycle and the negative half-cycle of the dynamo as well as current from the first capacitor; and
  wherein the battery comprises a third capacitor.

12. The circuit according to claim 11 further comprising a first transistor for selectively providing power from the dynamo to the battery, wherein voltage from at least one of the first and second capacitors is applied to a control terminal of the first transistor.

13. The circuit according to claim 12 wherein the lamp switch comprises a second transistor having a control terminal coupled for receiving a voltage from the second capacitor.

14. The circuit according to claim 13 wherein the lamp switch comprises a third transistor coupled in series with the second transistor, wherein the third transistor has a control terminal coupled to the lamp control circuit so that the third transistor is turned on when the battery voltage is above the selected value.

15. The circuit according to claim 14 further comprising a third diode for rectifying power from the dynamo to the battery.

16. The circuit according to claim 15 further comprising a fourth diode coupled in parallel with the third transistor for allowing current to flow to the lamp during one of the positive half-cycle and the negative half-cycle of the dynamo.

17. The circuit according to claim 16 further comprising a fifth diode coupled in parallel with the second transistor.

* * * * *